United States Patent [19]
Carpenter

[11] Patent Number: 5,525,290
[45] Date of Patent: Jun. 11, 1996

[54] METHOD OF MANUFACTURING A DECORATED HELMET

[75] Inventor: Waylin J. Carpenter, Sacramento, Calif.

[73] Assignees: Wes Carpenter; Tina Carpenter, both of Sacramento, Calif.; part interest to each

[21] Appl. No.: 195,391

[22] Filed: Feb. 14, 1994

Related U.S. Application Data

[63] Continuation of Ser. No. 110,881, Aug. 24, 1993, abandoned, which is a continuation-in-part of Ser. No. 866,338, Apr. 9, 1992, abandoned.

[51] Int. Cl.$^6$ .............................. A42B 3/00; B29C 35/00
[52] U.S. Cl. .............................. 264/510; 2/425; 264/259; 264/271.1; 264/553; 264/571; 264/138
[58] Field of Search .............................. 156/242, 245, 156/285, 286; 2/421, 425, 422, 410; 264/510, 553, 571, 259, 271.1, 274, 138

[56] References Cited

U.S. PATENT DOCUMENTS

| | | |
|---|---|---|
| 2,335,139 | 11/1943 | Wright . |
| 2,419,758 | 4/1947 | Borkland . |
| 4,447,282 | 5/1984 | Valerio et al. . |
| 4,644,630 | 2/1987 | Blum . |
| 4,698,258 | 10/1987 | Harkins, Jr. . |
| 4,769,100 | 9/1988 | Short et al. . |
| 4,824,506 | 4/1989 | Hoerner et al. . |
| 4,838,973 | 6/1989 | Mentzer et al. . |
| 5,034,077 | 7/1991 | Pata . |

FOREIGN PATENT DOCUMENTS 2103468   2/1963   United Kingdom .

Primary Examiner—Michele K. Yoder
Attorney, Agent, or Firm—Thomas R. Lampe

[57] ABSTRACT

A decorated helmet is formed by applying a decoration to a side of a plastic sheet. The plastic sheet is heated and applied to a helmet shell with the decoration between the plastic sheet and the helmet shell. A vacuum is applied to the heated plastic sheet to stretch the plastic sheet and mold the plastic sheet directly about the helmet shell with the decorations sandwiched between the plastic sheet and the helmet shell.

3 Claims, 4 Drawing Sheets

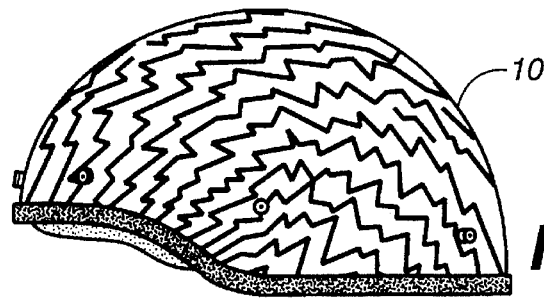
FIG._1
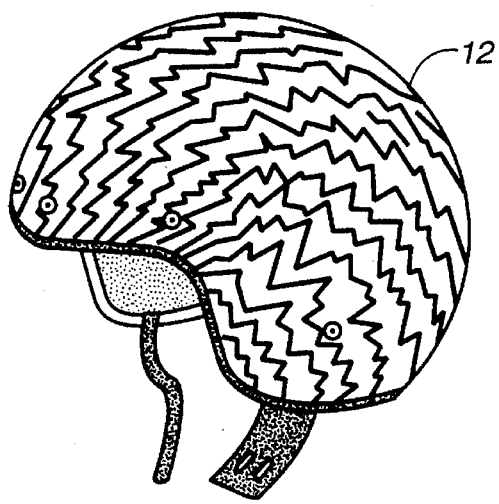
FIG._2
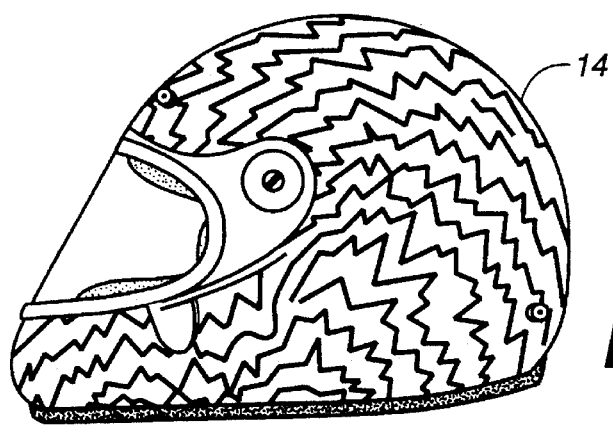
FIG._3

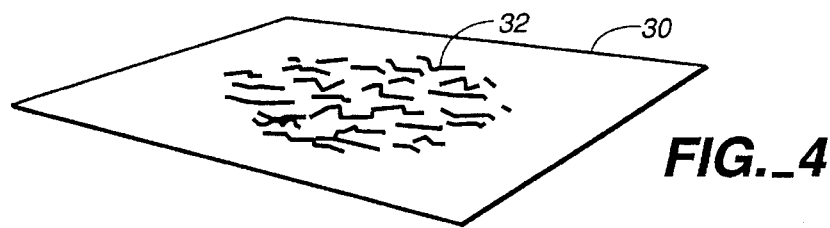
FIG._4
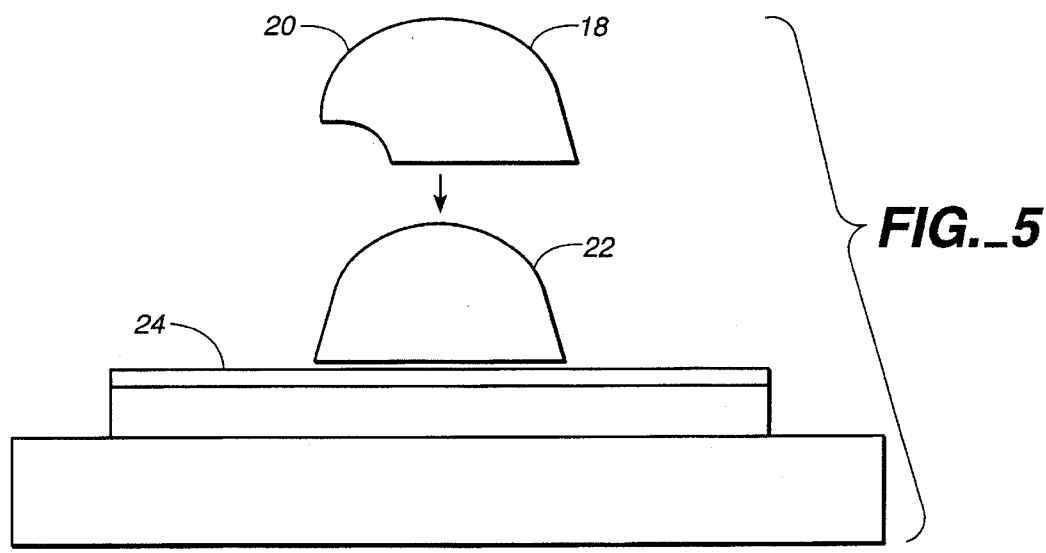
FIG._5
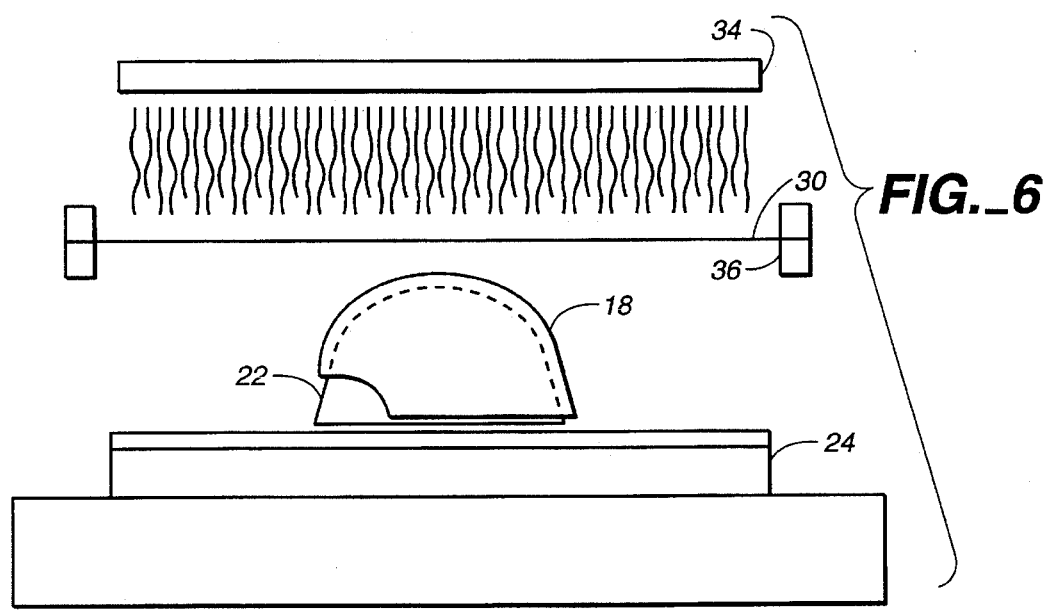
FIG._6

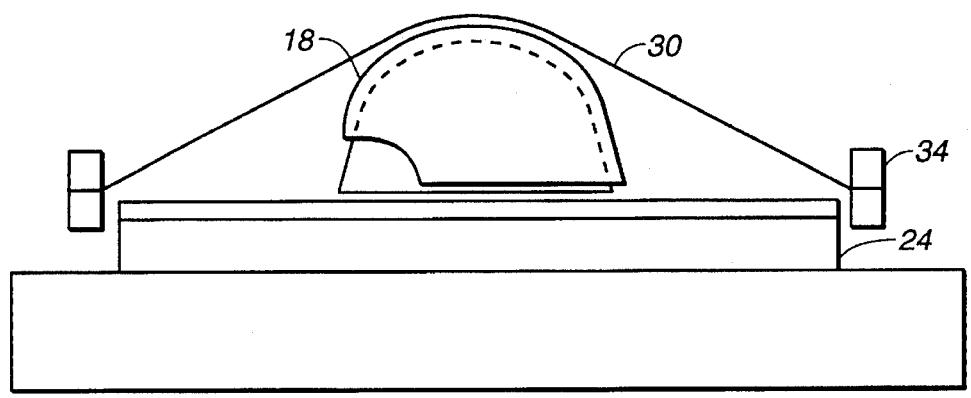
FIG._7
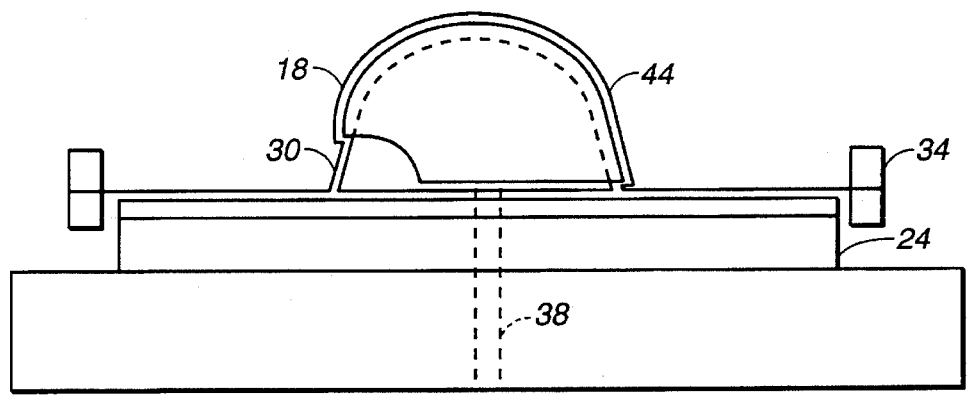
FIG._8
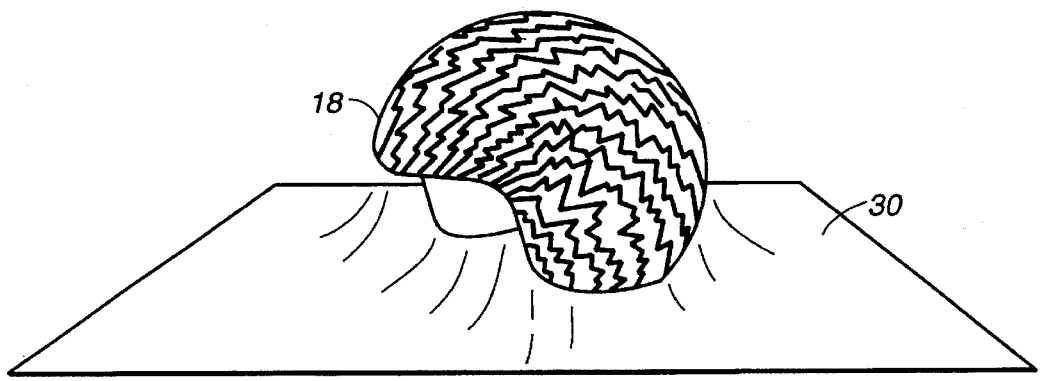
FIG._9

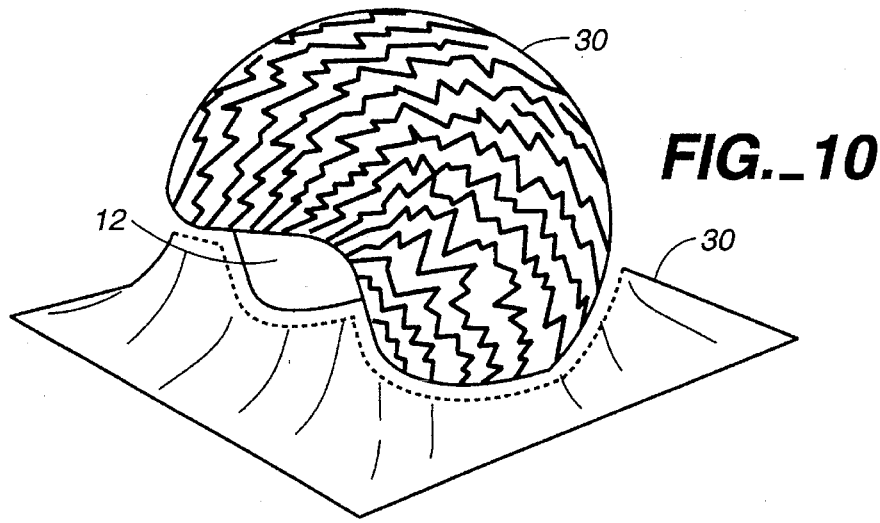
FIG._10
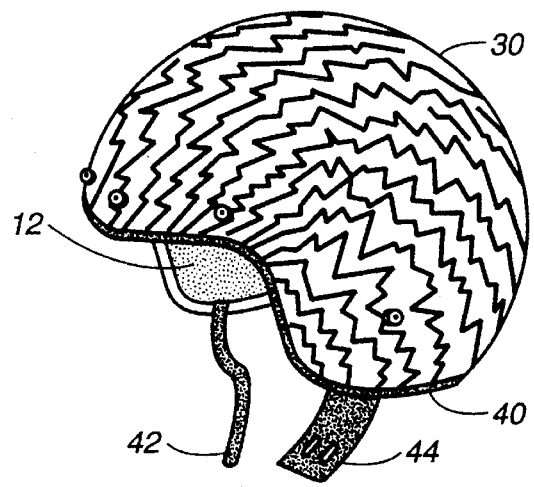
FIG._11
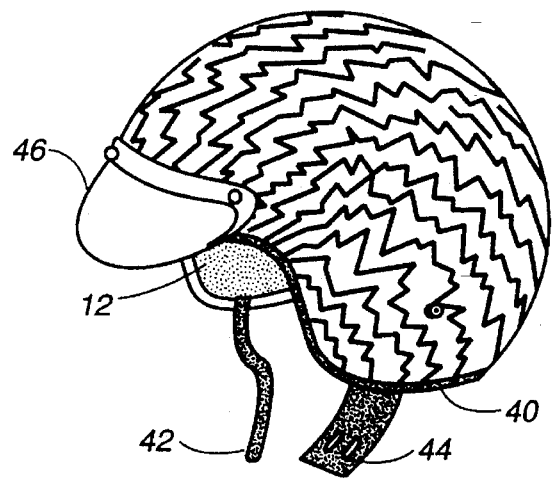
FIG._12

METHOD OF MANUFACTURING A DECORATED HELMET

This is a continuation of application Ser. No. 08/110,881 filed Aug. 24, 1993, now abandoned which is a continuation in part of application Ser. No. 866,338, filed Apr. 9, 1992, now abandoned.

TECHNICAL FIELD

This invention relates to decorated helmets and a method of manufacturing decorated helmets. The invention has particular application to motorcycle helmets.

BACKGROUND ART

Decorative ornamentation of helmets has been a part of world culture since at least the time of the ancient Romans. A wide variety of methods have been employed to decorate helmets including, for example: hand painting, using a brush and enamel, acrylic or oil-based paints; air brush graphics using a hand held air brush and acrylic enamel or lacquer paint; decals wherein adhesive is utilized to adhere a thin film of plastic or other material to the object; and spray painting with air pressure guns utilizing enamel or lacquer paints.

Such approaches are generally deficient in that they are inefficient, time consuming and expensive, thereby limiting their application mostly to custom orders and small production runs. The inefficiency of these prior art approaches has led to a limited variety of motorcycle helmet decorations. This is true even in the case of the relatively commonly employed expedients of vinyl taping and adhesive decal processes which currently produce the liveliest designs for motorcycle helmets and the like.

The present invention utilizes a vacuum-forming step during the process of manufacturing a decorated helmet. While vacuum-forming techniques have been employed to manufacture decorative active-sporting helmets, particularly what are commonly known as "bicycle helmets", conventional processes employ separate molds, an approach not applicable to motorcycle helmets and other types of helmets because of their shapes, designs, and venting schemes.

Applicant is aware of the following United States patents: U.S. Pat. No. 5,034,077, issued Jul. 23, 1991, U.S. Pat. No. 4,838,973, issued Jun. 13, 1989, U.S. Pat. No. 4,824,506, issued Apr. 25, 1989, U.S. Pat. No. 4,769,100, issued Sep. 6, 1988, U.S. Pat. No. 4,698,258, issued Oct. 6, 1987, U.S. Pat. No. 4,644,630, issued Feb. 24, 1987, U.S. Pat. No. 4,447,282, issued May 8, 1984, U.S. Pat. No. 2,419,758, issued Apr. 29, 1947, and U.S. Pat. No. 2,335,139, issued Nov. 23, 1943.

None of the patents noted above relate to helmet decoration. Furthermore, the various disclosed techniques and approaches of these patents are not applicable or pertinent to the decoration of helmets in the manner taught by applicant herein.

DISCLOSURE OF INVENTION

The present invention relates to a method which inexpensively, efficiently, and effectively decorates helmets. Utilizing the method of the present invention, one can produce decorated helmets with virtually any decoration desired. Furthermore, the completed decorated helmet clearly displays the decoration while protecting the decoration against damage, such as damage caused by impacts.

The method of manufacturing a decorated helmet according to the present invention includes the step of applying a decoration to a side of a plastic sheet to provide a decorated plastic sheet side.

The plastic sheet is heated after the decoration has been applied to the side of the plastic sheet.

Relative movement is effected between the plastic sheet and a helmet shell to bring the decorated plastic sheet side into direct engagement with the helmet shell while the plastic sheet is in a heated condition.

A vacuum is applied to the heated plastic sheet to stretch the heated plastic sheet and mold the plastic sheet directly about a substantial portion of the helmet shell with the decoration sandwiched directly between the heated plastic sheet and the helmet shell.

The heated plastic sheet is cooled on the helmet shell and the plastic sheet is retained on the helmet shell after cooling thereof with the decoration disposed between the helmet shell and the plastic sheet whereby the plastic sheet forms a solid cover affording protection for the decoration.

The present invention additionally encompasses a decorated helmet of a specific character. More particularly, the decorated helmet includes a rigid helmet shell having a smoothly curved outer surface.

The plastic cover is molded directly on the helmet shell. The plastic cover covers at least a substantial portion of the smoothly curved outer surface of the helmet shell and generally conforms in shape to the shape of the substantial portion of the smoothly curved outer surface.

A decoration applied to the underside of the plastic cover is sandwiched between the smoothly curved outer surface of the helmet shell and the plastic cover.

Other features, advantages, and objects of the present invention will become apparent with reference to the following description and accompanying drawings.

BRIEF DESCRIPTION OF DRAWINGS

FIGS. 1, 2 and 3 are side, perspective views of three alternative shapes of motorcycle helmets, all of which have been decorated in accordance with the teachings of the present invention;

FIG. 4 is a perspective view of a plastic sheet decorated on one side thereof in accordance with the method of the present invention;

FIG. 5 illustrates a motorcycle helmet shell being lowered into position on a helmet stand associated with a vacuum machine;

FIG. 6 is a somewhat schematic side view illustrating a plastic sheet after the decoration has been applied thereto being heated and prior to positioning of the plastic sheet over a helmet shell;

FIG. 7 is a somewhat schematic side view illustrating the heated plastic sheet being drawn over a helmet shell;

FIG. 8 is a view similar to that of FIG. 7 illustrating the condition of the heated plastic sheet after it has been drawn over the helmet shell by vacuum;

FIG. 9 is a perspective view of a helmet shell having the decorated plastic sheet molded thereto in accordance with the teachings of the present invention;

FIG. 10 is a perspective view showing the decorated helmet of FIG. 9 with excess plastic sheeting trimmed therefrom;

FIG. 11 is a perspective view showing the helmet of FIGS. 9 and 10 with chin straps applied thereto and securement holes formed therein; and FIG. 12 is a perspective view of the decorated helmet employing the shell of FIGS. 9 and 10 fully assembled with chin straps and visor.

BEST MODE FOR CARRYING OUT THE INVENTION

FIGS. 1, 2 and 3 illustrate three forms of decorated helmets manufactured in accordance with the teachings of the present invention. More particularly, FIG. 1 illustrates what is known as a motorcycle half-helmet, designated by reference numeral 10. FIG. 2 illustrates a motorcycle ¾ helmet 12. And FIG. 3 discloses a motorcycle full-faced helmet 14.

The invention may be utilized in the construction of a wide variety of helmet configurations and helmets 10, 12 and 14 are merely representative of helmet types to which the present invention has application. Each of the decorated helmets includes, as will be described in more detail below, a rigid helmet shell, a plastic cover molded directly on the helmet shell, and a decoration applied to the underside of the plastic cover and sandwiched between the smoothly curved outer surface of the helmet shell and the plastic cover.

FIG. 5 illustrates a half-helmet shell 18 which is one of the structural elements of the decorated half-helmet 10 shown in FIG. 2. The shell 18 is of rigid construction and has a smoothly curved outer surface 20. In FIG. 5, the helmet shell 18 is being lowered onto a helmet stand or mandrel 20 operatively associated with a vacuum machine having a base 24. The vacuum machine may be of any suitable type and, of course, includes apertures (not shown) through which air is drawn during the vacuum forming process.

FIG. 4 illustrates a plastic sheet 30, said sheet to be utilized to form a cover for the helmet shell 18. Any suitable vacuum-formable plastic material may be utilized, examples being: polymethyl-methacrylate, polythene, polypropylene, polystyrene, ABS, polyvinyl, cellulose nitrate, aceto-butyrate, polycarbonate, and polyester.

The plastic sheet 30 has a decoration 32 applied to one side thereof. The decoration illustrated is in the nature of a random striation-like pattern; however, it is to be understood that this is for illustration purposes only and that the decoration 32 can be of any desired type and character, including decorations of solid or multi-colors covering the sheet side completely.

A preferred approach for applying decoration 32 to the side of the plastic sheet is to silk screen the pattern on the sheet utilizing conventional silk screen apparatus and procedures. The ink employed to create the decoration may be of any suitable vacuum-formable type, examples being: Naz-Dar Plastivac ink, Naz-Dar All Purpose ink, DVK Dezyne Multi-Purpose ink, Color-Mix "HG" Series ink, and Manoukian Evolution ink.

After decoration 32 has been applied to the plastic sheet 30 the sheet is heated, preferably on the side thereof opposed to the side bearing the decoration 32. FIG. 6 shows plastic sheet 30 being heated by a heater 34 having coils or other heating elements. Plastic sheet 30 is illustrated as being supported by a holding frame 36 during the heating process.

In FIG. 6, the frame and plastic sheet are illustrated as being disposed above helmet shell 18 which, as stated above, is located on helmet stand 22 above vacuum machine base 24.

Referring now to FIG. 7, relative movement between the plastic sheet 30 and helmet shell 18 now takes place, it being understood that the plastic sheet 30 is in a heated condition. The sheet 30 is brought into direct engagement with the helmet shell at the side of the plastic sheet which bears decoration 30. That is, the decoration is disposed on the underside of plastic sheet 30 as viewed in FIG. 7.

A vacuum is applied from base 24 through a passageway 38 in the base providing communication between apertures (not shown) at the top of the vacuum machine to a suitable source of vacuum (not shown). This serves to draw the heated plastic sheet 30 tightly about the helmet shell 18 so that the shape of the plastic sheet 30 conforms to the shape of the smoothly curved outer surface of the helmet shell. At the same time, the plastic sheet is stretched at least 200 percent. In other words, the heated plastic sheet 30 is molded directly and tightly about the helmet shell. The plastic sheet should be heated to a temperature within the range of from about 225 degrees Fahrenheit to about 375 degrees Fahrenheit prior to bringing the decorated plastic sheet side into direct engagement with the helmet shell.

FIG. 9 shows the condition of a motorcycle ¾ helmet shell 12 after a plastic sheet 30 has been applied thereto in the same manner described above with respect to half-helmet shell 18. Regardless of the shape of the helmet shell, the plastic sheet 30 will conform to the shape thereof. After the plastic sheet 30 has been applied to the particular helmet shell, the plastic sheet is allowed to cool on the helmet shell. With the plastic sheet materials indicated above, there is no adhesive bonding occurring between the helmet shell and the plastic sheet. It has been found that some degree of bubbling, cracking or other damage to the outer cover comprising the plastic sheet can occur if there is an adhesive bond. Preferably, the plastic sheet 30 comprising the cover has a thickness within the range of from about 0.005 inches to about 0.3 inches after cooling thereof.

Now the plastic sheet or cover 30 is trimmed as shown in FIG. 10 so that excess plastic sheeting is removed. That is, in the illustration of FIG. 10 the plastic sheet 30 forms a cover coextensive with the outer surface of the helmet shell. Trimming can be accomplished when the plastic sheet is either wholly or partially cooled.

After the cover of plastic sheet 30 has been cooled and trimmed, the remaining constituent elements of the decorated helmet may be added. FIGS. 11 and 12 illustrate trim 40, trim straps 42, 44 and a visor 46 added to helmet shell 12 after the decorated cover is in place.

I claim:

1. A method of manufacturing a decorated helmet, said method comprising the steps of:

positioning a rigid helmet shell at a selected location, said rigid helmet shell having a smoothly curved outer surface;

applying a decoration to a selected side of a plastic sheet to provide a decorated plastic sheet side, said plastic sheet comprised of vacuum-formable plastic material which will not adhere to the rigid helmet shell when heated and applied thereto in heated condition;

heating the plastic sheet after the decoration has been applied to the selected side of said plastic sheet;

effecting relative movement between said plastic sheet and said rigid helmet shell to bring the decorated plastic sheet side into direct engagement with the smoothly curved outer surface of said helmet shell while the plastic sheet is in heated condition;

applying a vacuum to said plastic sheet while the plastic sheet is in heated condition at the decorated plastic sheet side thereof to stretch said plastic sheet and mold said plastic sheet while said plastic sheet is in heated condition directly about and in direct engagement with the smoothly curved outer surface of said rigid helmet shell over the full extent of engagement with the decoration sandwiched directly between said plastic sheet and said rigid helmet shell and said plastic sheet covering said smoothly curved outer surface, and with no adhesive or bonding existing between said plastic sheet and said rigid helmet shell;

cooling said molded plastic sheet on said rigid helmet shell with the molded plastic sheet in direct engagement with and covering the smoothly curved outer surface and no bonding taking place between said molded plastic sheet and said smoothly curved outer surface; and retaining said molded plastic sheet on said rigid helmet shell after cooling thereof with the decoration disposed between said rigid helmet shell and said molded plastic sheet whereby said molded plastic sheet forms a solid cover affording protection for said decoration and said smoothly curved outer surface, said plastic sheet being retained on said rigid helmet shell, covering said smoothly curved outer surface, and completely absent a bond between said molded plastic sheet and said rigid helmet shell, said plastic sheet when in heated condition being stretched at least 200 percent when said plastic sheet is molded directly about said rigid helmet shell in unbonded condition, and said plastic sheet being heated to a temperature within the range of from about 225 degrees Fahrenheit to about 375 degrees Fahrenheit prior to bringing the decorated plastic sheet side into direct engagement with the rigid helmet shell.

2. The method according to claim 1 wherein said plastic sheet has a thickness within the range of from about 0.005 in. to about 0.3 in. after cooling thereof.

3. The method according to claim 1 including the additional step of trimming excess plastic from said plastic sheet after said plastic sheet has been heated and molded directly about a substantial portion of said rigid helmet shell.

* * * * *